US008731592B2

(12) United States Patent
Jeong et al.

(10) Patent No.: US 8,731,592 B2
(45) Date of Patent: May 20, 2014

(54) METHOD FOR TRANSMITTING/RECEIVING SERVICE AVAILABILITY INFORMATION OF MULTIMEDIA BROADCASTING/MULTICAST SERVICE (75) Inventors: Kyeong-In Jeong, Suwon-si (KR); Sung-Ho Choi, Suwon-si (KR); Kook-Heui Lee, Yongin-si (KR); Gert Jan Van Lieshout, Apeldoorn (NL)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 10/957,779

(22) Filed: Oct. 4, 2004

(65) Prior Publication Data

US 2005/0111393 A1    May 26, 2005

(30) Foreign Application Priority Data

Oct. 2, 2003  (KR) .................. 10-2003-0068953

(51) Int. Cl.
 *H04W 72/00*  (2009.01)
(52) U.S. Cl.
 USPC ............................ 455/522; 455/69; 455/414.1
(58) Field of Classification Search
 CPC ................................................... H04W 72/005
 USPC ............................. 455/522, 69, 414, 555
 See application file for complete search history.

(56) References Cited

U.S. PATENT DOCUMENTS

| 6,898,429 | B1 * | 5/2005 | Vialen et al. | 455/432.1 |
| 7,054,619 | B2 * | 5/2006 | Kettunen et al. | 455/414.2 |
| 7,254,409 | B2 | 8/2007 | Sato et al. | |
| 2003/0134640 | A1 | 7/2003 | Kim et al. | |
| 2003/0134653 | A1 * | 7/2003 | Sarkkinen et al. | |
| 2003/0207696 | A1 * | 11/2003 | Willenegger et al. | 455/522 |
| 2004/0017809 | A1 * | 1/2004 | Park | 370/390 |
| 2004/0103435 | A1 * | 5/2004 | Yi et al. | 455/555 |
| 2004/0117860 | A1 * | 6/2004 | Yi et al. | 725/147 |

(Continued)

FOREIGN PATENT DOCUMENTS

| JP | 2001-308856 | 11/2001 |
| JP | 2001-523422 | 11/2001 |

(Continued)

OTHER PUBLICATIONS

3rd Generation Partnership Project; Technical Specification Group Services and System Aspects; Multimedia Broadcast/Multicast Service; Architecture and Functional Descriptions, Sep. 2002.

(Continued)

*Primary Examiner* — Wen Huang
(74) *Attorney, Agent, or Firm* — The Farrell Law Firm, P.C.

(57) ABSTRACT

Disclosed is a mobile communication system for providing a number of User Equipment (UEs) positioned in a plurality of cells with Multimedia Broadcast/Multicast Service (MBMS) using CDMA technology. A Radio Network Controller (RNC) transmits a MBMS availability message to each of the plurality of cells under management regarding at least one MBMS which is available in a corresponding cell in order to support the mobility of the UE which receives the MBMS. The UE decides whether it can receive a desired MBMS in the current cell, after receiving the MBMS availability message, and requests the desired MBMS or reselects another cell. The continuity of MBMS reception is improved while UEs using the MBMS are moving and the overhead of RRC connection setup for unnecessary MBMS request is reduced.

11 Claims, 9 Drawing Sheets

(56) References Cited

U.S. PATENT DOCUMENTS

| | | | |
|---|---|---|---|
| 2004/0203655 A1* | 10/2004 | Sinnarajah et al. | 455/414.1 |
| 2005/0070277 A1* | 3/2005 | Hu | 455/432.3 |
| 2005/0233760 A1* | 10/2005 | Voltolina et al. | 455/503 |
| 2006/0166653 A1* | 7/2006 | Xu et al. | 455/412.2 |

FOREIGN PATENT DOCUMENTS

| | | |
|---|---|---|
| JP | 2002-171548 | 6/2002 |
| JP | 2003-188818 | 7/2003 |
| JP | 2005-518725 | 6/2005 |
| WO | WO 03/071725 | 8/2003 |
| WO | WO 2004/052040 | 6/2004 |
| WO | WO 2004/102831 | 11/2004 |

OTHER PUBLICATIONS

LG Information & Communications, Ltd.: Definitions and Characteristics of Multicast Channels, TSG RAN Working Group 2, Mar. 8, 1999.

Nokia: On MBMS Notifications and Service Announcements, TSG-RAN WG2 Meeting #31, Aug. 19, 2002.

Siemens: Considerations on MBMS Notification, Jan. 15, 2003.

* cited by examiner

| Information Element/Group name | Multi | Type and reference | Semantics description |
|---|---|---|---|
| Message Type | | Message Type | |
| MBMS information elements | | | |
| MBMS service id | Multiple to max MBMS | | Only for MBMS being SA. MBMS being NSA is not included |
| > PtM indication | | Boolean | Indicates the service is on PtM or others |
| > Mapping information for mRNTi | | | Indicates mapping info about MBMS service id and mRNTi |

METHOD FOR TRANSMITTING/RECEIVING SERVICE AVAILABILITY INFORMATION OF MULTIMEDIA BROADCASTING/MULTICAST SERVICE

PRIORITY

This application claims priority to an application entitled "Method For Transmitting/Receiving Service Availability Information Of Multimedia Broadcasting/Multicast Service" filed with the Korean Intellectual Property Office on Oct. 2, 2003 and assigned Serial No. 2003-68953, the contents of which are incorporated herein by reference.

BACKGROUND OF THE INVENTION

1. Field of the Invention

The present invention relates to a method for providing a Multimedia Broadcast/Multicast Service (hereinafter referred to as "MBMS") in a mobile communication system, and more particularly to a method for transmitting/receiving service availability information for the MBMS in order to support the mobility of user equipment.

2. Description of the Related Art

Recent progress in communication technology and increases in users' need have caused Code Division Multiple Access (CDMA) mobile communication systems to support a multimedia service, in addition to voice service. Multimedia service transmits a large capacity of data using circuit communication, packet communication, and the like. In order to support multimedia communication, $3^{rd}$ generation standardization organizations provide various standards for providing MBMS to a number of user equipments (hereinafter referred to as "UE") with the same data from a single data source.

Figure 1:
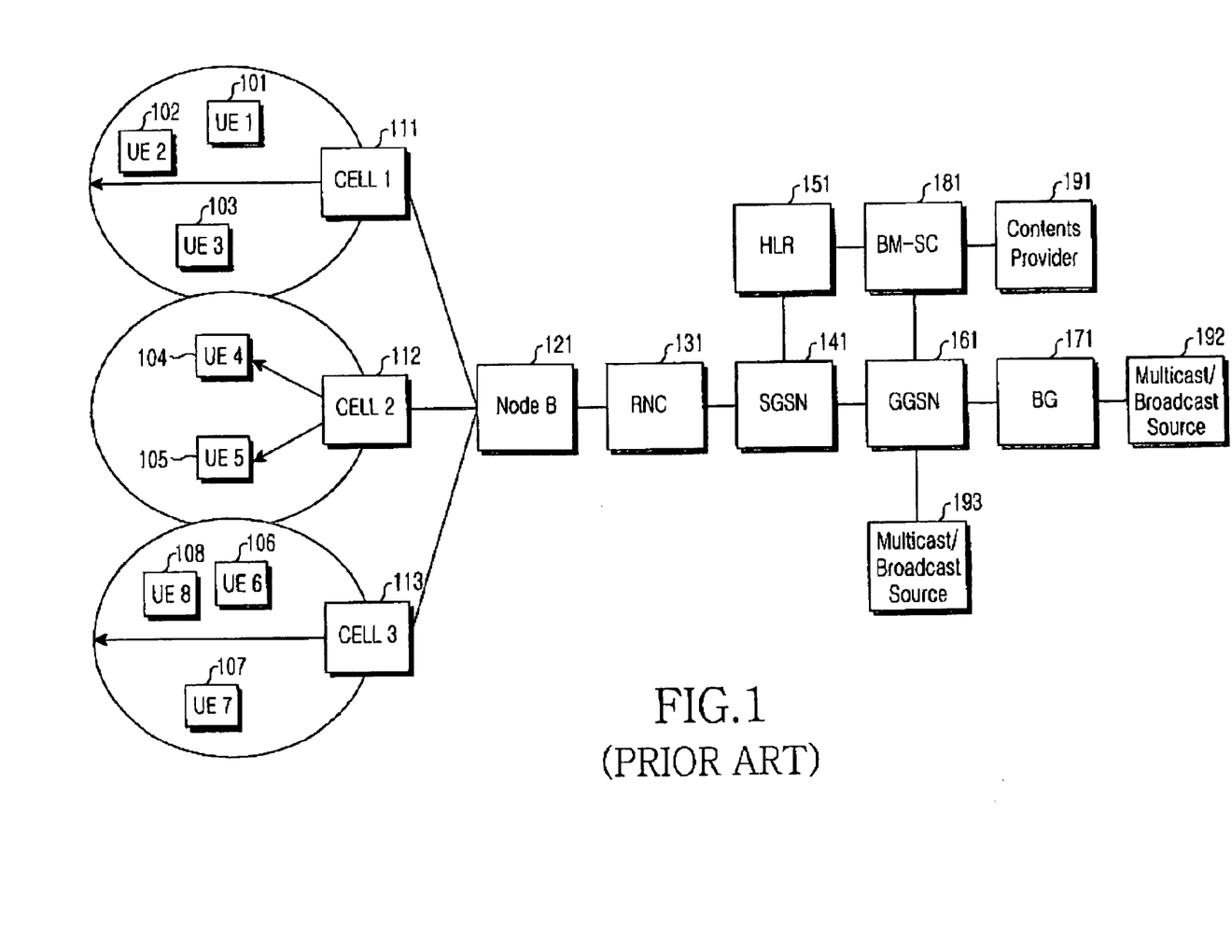
FIG. 1 shows the construction of a conventional mobile communication system for MBMS.

FIG. 1 shows the construction of a conventional mobile communication system for providing MBMS. The system is a $3^{rd}$ Generation Partnership Project (3GPP( )) system, which is the standard of the $3^{rd}$ generation asynchronous mobile communication mode based on Global System for Mobile communications (GSM) and General Packet Radio Service (GPRS) and which is adapted to provide MBMS.

Referring to FIG. 1, UEs 101, 102, 103, 104, 105, 106, 107, and 108 refer to apparatuses capable of receiving MBMS data and cells 111, 112, and 113 refer to cell areas of Node Bs in which the UEs 101 to 108 are positioned. A Node B 121 performs an exchange between radio signals and wired signals according to the 3GPP standard and provides the UEs 101 to 108 in the cells 111 to 113 with MBMS.

A Radio Network Controller (hereinafter referred to as RNC) 131 manages a number of Node Bs and controls radio channels which are established between the Node Bs and the UEs in order to provide the Node B 121, as well as a number of other Node Bs (not shown) which support MBMS, with MBMS data. The RNC 131 and the Node B 121 constitute a UMTS Terrestrial Radio Access Network (hereinafter referred to as UTRAN), which plays the role of connecting the UEs 101 to 108 to a Core Network (hereinafter referred to as CN).

A Serving GPRS Support Node (SGSN) 141 controls the service of respective MBMS subscribers. As a representative example, the SGSN manages the service charging data of respective subscribers and selectively provides a specific RNC with multimedia data. A Home Location Register (HLR) 151 is connected to the SGSN 141 and authenticates subscribers. A Gateway GPRS Support Node (GGSN) 161 receives MBMS data, which is to be supplied to the UEs 101 to 108, from a content provider 191 and multicast/broadcast sources 192 and 193 via a Broadcast/Multicast Service Center (BM-SC) 181 and a Border Gateway (BG) 171 and transmits it to the SGSN 141. The GGSN 161 also manages the movement of the UEs 101 to 108 and the service quality of the MBMS provided to the UEs 101 to 108. The content provider 191 and the multicast/broadcast sources 192 and 193 are the source site of MBMS data transmission.

The BG 171 receives MBMS data from the multicast/broadcast source 192, which belongs to a network that is not currently managed by the service carrier, and delivers it to the GGSN 161. The BM-SC 181 receives MBMS data from the content provider 191 and delivers it to the GGSN 161. The BM-SC 181 performs authentication on the content provider 191; decision on MBMS service quality; error correction on MBMS data loss; charging on the content provider 191; and the like. The BM-SC 181 also notifies the UEs 101 to 108 of MBMS services which are currently provided.

An MBMS data stream is transmitted to the GSSN 161 from the content provider 191 via the BM-SC 181, from the multicast/broadcast source 192 of an external network via the BG 171, or directly from the multicast/broadcast source 193 of an internal network. The MBMS data stream is then delivered to the UEs 101 to 108 in the cells 111 to 113 via the Node B 121 under the control of the SGSN 141 and the RNC 131.

Although not shown in the drawings, it is understood that a number of SGSNs and a number of RNCs connected to the respective SGSNs may exist for a single MBMS. The SGSN and the RNC perform selective data transmission to the RNC and the Node B, respectively, and store the list of nodes to which data is to be delivered (the list of RNC in the case of SGSN and the list of Node B in the case of RNC) to this end.

Figure 2:
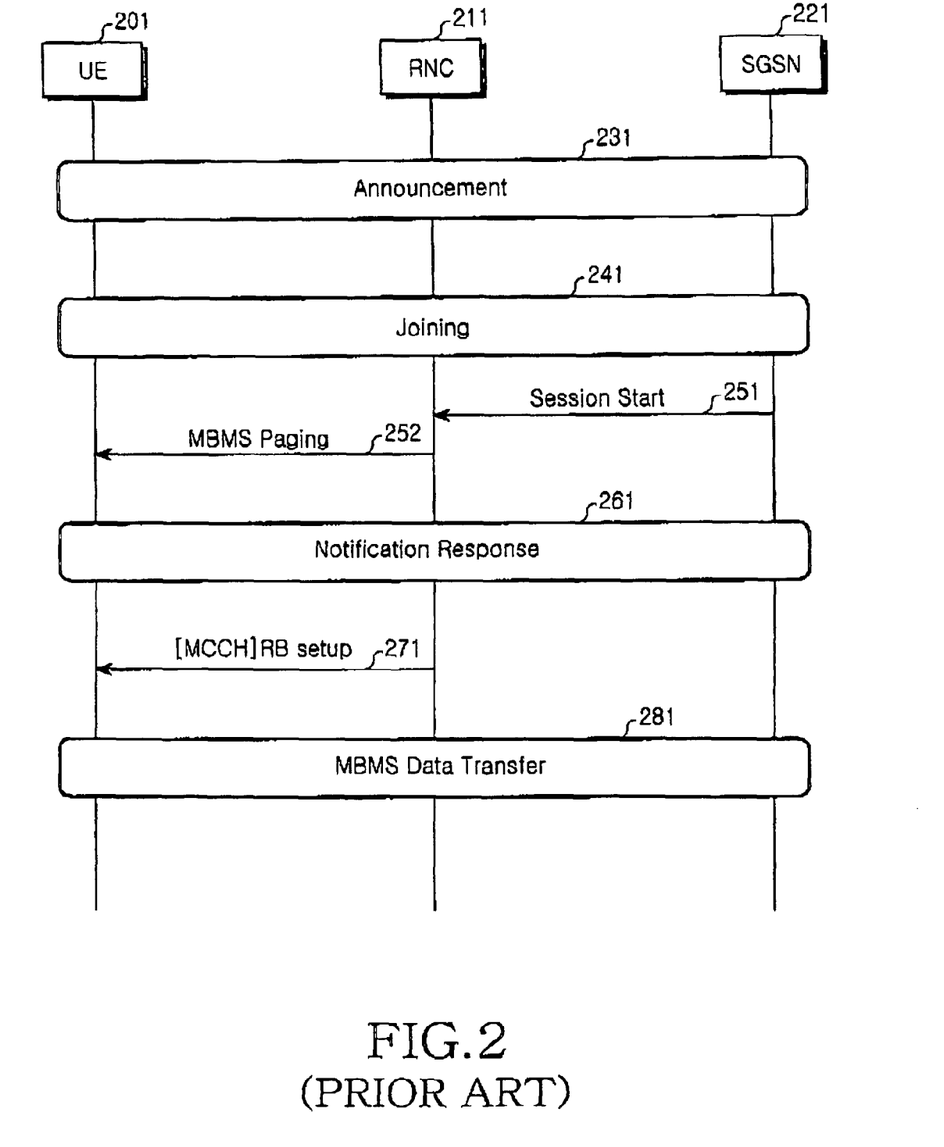
FIG. 2 is a message flowchart showing a conventional MBMS procedure.

FIG. 2 is a message flowchart showing a conventional MBMS procedure. In the drawing, only the signal flow among a UE 201 to which MBMS is provided, an RNC 211 for MBMS, and an SGSN 221 for MBMS is shown in order to clearly illustrate the procedure for providing MBMS in a specific cell.

Referring to FIG. 2, the SGSN 221 announces information on MBMSs, e.g. MBMS identifiers and whether MBMSs are provided, to the UE 201 via the RNC 211 in step 231. When the UE 201 finds a desired one among the MBMSs recognized in the announcement step 231, it announces that it will join the desired MBMS to the SGSN 221 via the RNC 211 in step 241. In the joining step 241, the UE 201 notifies the SGSN 221 of the identifier of an MBMS it wants to receive and the SGSN 221 authenticates the UE 201 and notifies the UE 201 of whether it can receive the MBMS. The SGSN 221 stores a list and location of UEs which want to receive a specific MBMS in the joining step 241.

If a BM-SC announces the beginning of MBMS which the UE 201 has joined, the SGSN 221 transmits a "Session Start" message to the RNC 211 in which the UE 201 is positioned in step 251. The RNC 211 transmits an MBMS paging message to the UE 201 in step 252 in order to notify that the MBMS will start. The step 252 is referred to as "group paging", in contrast to existing paging procedure, because the MBMS paging message is transmitted to a plurality of UE which have joined the MBMS.

The UE 201 transmits a notification response regarding the paging in step 261. The RNC 211 counts the number of UEs that want to receive MBMS, of respective cells and decides the kind of radio channel of the corresponding cell, i.e. the service type, in step 261. If the number of UEs which want to receive the MBMS is not smaller than a predetermined threshold value, the RNC 211 provides the MBMS via a common channel in a Point-to-Multipoint (hereinafter referred to as PtM) mode. If the number is smaller than the predetermined threshold value, the RNC 211 provides the MBMS by setting up Radio Resource Control (RRC) connection of respective UEs and by constituting an exclusive channel in a Point-to-Point (hereinafter referred to as PtP) mode.

The RNC 211 transmits MBMS Radio Bearer (RB) information to the UE 201 in step 271. The MBMS RB information includes information on the radio channel to which MBMS is to be provided, such as Orthogonal Variable Spreading Factor (OVSF) code information; transport format information; Radio Link Control (hereinafter referred to as RLC) information; and Packet Data Convergence Protocol (hereinafter referred to as PDCP) information. The UE 201 receives the MBMS according to the MBMS RB information.

When MBMS RB information is used to provide a specific MBMS in a specific cell, it is available to all UEs which want to receive the MBMS in the cell. Accordingly, it is effective to transmit a control signal, which is related to MBMS, via a common control channel which is provided in a cell. According to the 3GPP, an MBMS control signal is transmitted periodically via an MBMS Control Channel (hereinafter referred to as MCCH), which is a logical channel.

A plurality of cells, in which UEs can be positioned, may provide or fail to provide a specific MBMS according to an agreement with the service carrier or the availability of radio resources. However, a UE cannot determine whether MBMS which the UE wants to receive is available. In other words, the UE cannot determine whether the MBMS has Service Availability (SA) or Non-SA (NSA) in the cell in which the UE is positioned. As a result, a UE may needlessly perform the superfluous procedure of setting up RRC connection for MBMS having NSA and requesting the service. This causes the problem of generation of unnecessary signaling overhead and increasing service delay time.

SUMMARY OF THE INVENTION

Accordingly, the present invention has been made to solve the above-mentioned problems of conventional systems, and an object of the present invention is to provide a method for notifying a UE of service availability information regarding whether MBMS is available in each cell in a mobile communication system which provides MBMS.

Another object of the present invention is to provide a method for enabling a UE to request MBMS or select another cell, after recognizing that it has entered a cell in which MBMS is unavailable, in a mobile communication system which provides MBMS.

Still another object of the present invention is to provide a method for notifying a UE of service availability information, which indicates whether MBMSs have NSA or SA in each cell, in a mobile communication system which provides MBMS.

In order to accomplish this object, there is provided a method for transmitting service availability information on MBMS to UEs from an RNC in a mobile communication system including the RNC for controlling the MBMS of UEs positioned in a plurality of cells, the method including steps of deciding whether a specific MBMS is available to the plurality of cells; transmitting a paging message for the specific MBMS to UEs positioned in cells, to which the specific MBMS is available, of the plurality of cells; and transmitting a service availability message regarding at least one MBMS, which is available in the corresponding cell, to the UEs positioned in the plurality of cells.

In accordance with another aspect of the present invention, there is provided a method for receiving service availability information on MBMS, which a UE wants to receive, from an RNC in a mobile communication system including the RNC for controlling the MBMS, the method including steps of receiving a service availability message on at least one MBMS, which is available to a cell in which the UE is currently positioned, from the RNC; deciding whether the MBMS, which the UE wants, is available to the cell in which the UE is currently positioned according to the service availability message; and receiving the wanted MBMS at the cell, in which the UE is currently positioned, if the wanted MBMS is available.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted to avoid making the subject matter of the present invention unclear. In addition, the terminology used in the description is defined in consideration of the function of corresponding components used in the present invention and may be varied according to users, operator's intention, or practices. Accordingly, the definition must be interpreted based on the overall content disclosed in the description or by the application of the invention.

The present invention uses an MBMS control message which is transmitted periodically via an MCCH in order to transmit information on service availability from an RNC to a UE in a mobile communication system which provides MBMS will be described below.

The state of MBMS in a cell which a UE enters or in which a UE initially starts communication can be defined as follows: when MBMS is not available in a cell, it has Non-Service Availability (NSA) and, when available, it has Service Availability (SA). That is, when there is SA in a cell, MBMS is ready to be provided in the cell. This corresponds to a case wherein MBMS is currently provided or to a case wherein a session for providing MBMS has already begun and the MBMS can be provided if requested by a UE.

When a specific MBMS has NSA in a specific cell, a UE does not perform RRC connection setup to request MBMS. When a specific MBMS has SA in a specific cell, the cell is providing the MBMS in a PtP or PtM mode or is able to immediately start the MBMS when requested by a UE, even though it is not yet providing the MBMS because of the absence of the UE which has requested MBMS. The information regarding whether a specific MBMS has SA or NSA in a specific cell is included in a control message which is transmitted via an MCCH when the MBMS starts or while the MBMS is provided.

Figure 3A:
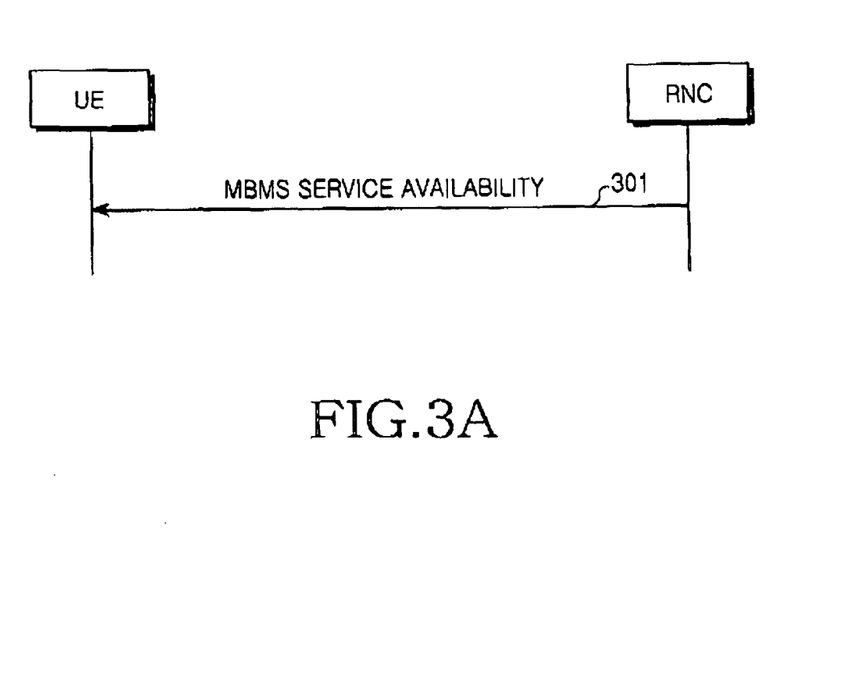
FIGS. 3a and 3b show control messages which are transmitted via MCCHs.
Figure 3B:
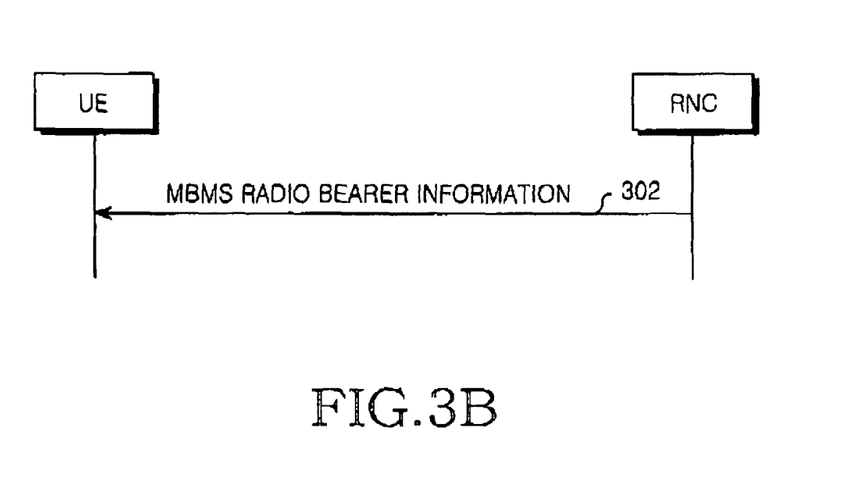

FIGS. 3a and 3b show control messages which are transmitted via MCCHs in order to support the mobility of UEs during MBMS. The control messages support the MBMS of UEs which are in a Packet Mobility Management (PPM) idle mode and in a PPM connected mode.

FIG. 3a shows the transmission of an MBMS service availability message 301, which is used to notify a UE of the service availability of a specific MBMS from an RNC while the MBMS is provided. The MBMS service availability message 301 transmitted in a specific cell includes service availability information on each of at least one MBMS which is available in the cell. The service availability information includes an MBMS identifier and a service type.

FIG. 3b shows the transmission of an MBMS RB information message 302, which is used by an RNC to inform a UE of RB information on an MBMS Traffic CHannel (hereinafter referred to as MTCH) which carries MBMS data. When MBMS is provided in PtP, an RB is set up to each UE and it is impossible to inform each UE of RB information via an MCCH. Therefore, the RB information of the MBMS RB information message 302 is available only to an MBMS which is provided in PtM. The MBMS RB information includes an MBMS identifier and information on logical channel/transport channel/physical channel.

Figure 4:
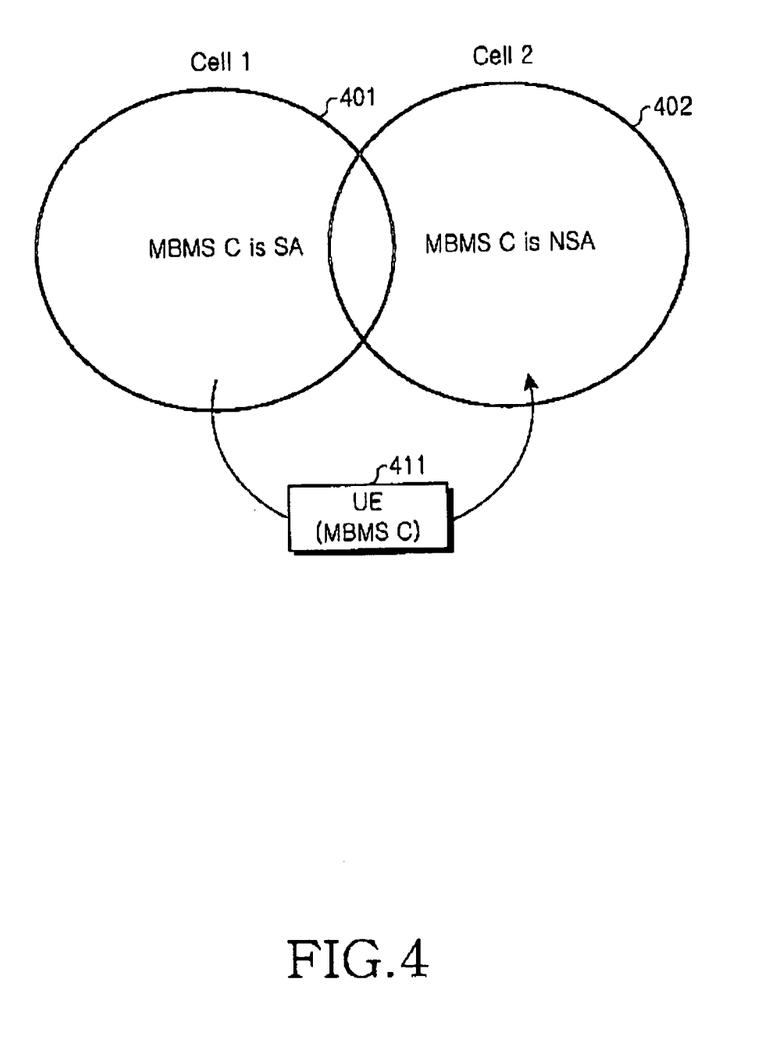
FIG. 4 shows the movement of a UE which is provided with MBMS.

FIG. 4 shows the movement of an UE which is provided with an MBMS. Reference numerals 401 and 402 refer to first and second cells, respectively, and reference numeral 411 refers to a UE moving from the first cell 401 to the second cell 402 while receiving MBMS C. In this example, the first cell 401 supports the MBMS C, but the second cell 402 does not. Accordingly, the MBMS C has SA in the first cell 401 and NSA in the second cell 402. The latter means that the second cell 402 is not the service area of the MBMS C or that, even if the second cell 402 is the service area, the MBMS C is not currently provided and cannot be provided even when requested by the UE. For example, if the MBMS C is not currently provided in the second cell 402 for lack of radio resources and cannot be provided even when requested by the UE, the second cell 402 then corresponds to NSA. When realizing that the MBMS C has NSA in the second cell 402, the UE 411 does not perform RB connection and service request unnecessarily, but can reselect a cell in which the MBMS C has SA or stay in the second cell 402. The operation of the UE 411 in the second cell 402, which corresponds to NSA, follows the system setup or the user's request.

Figure 5:
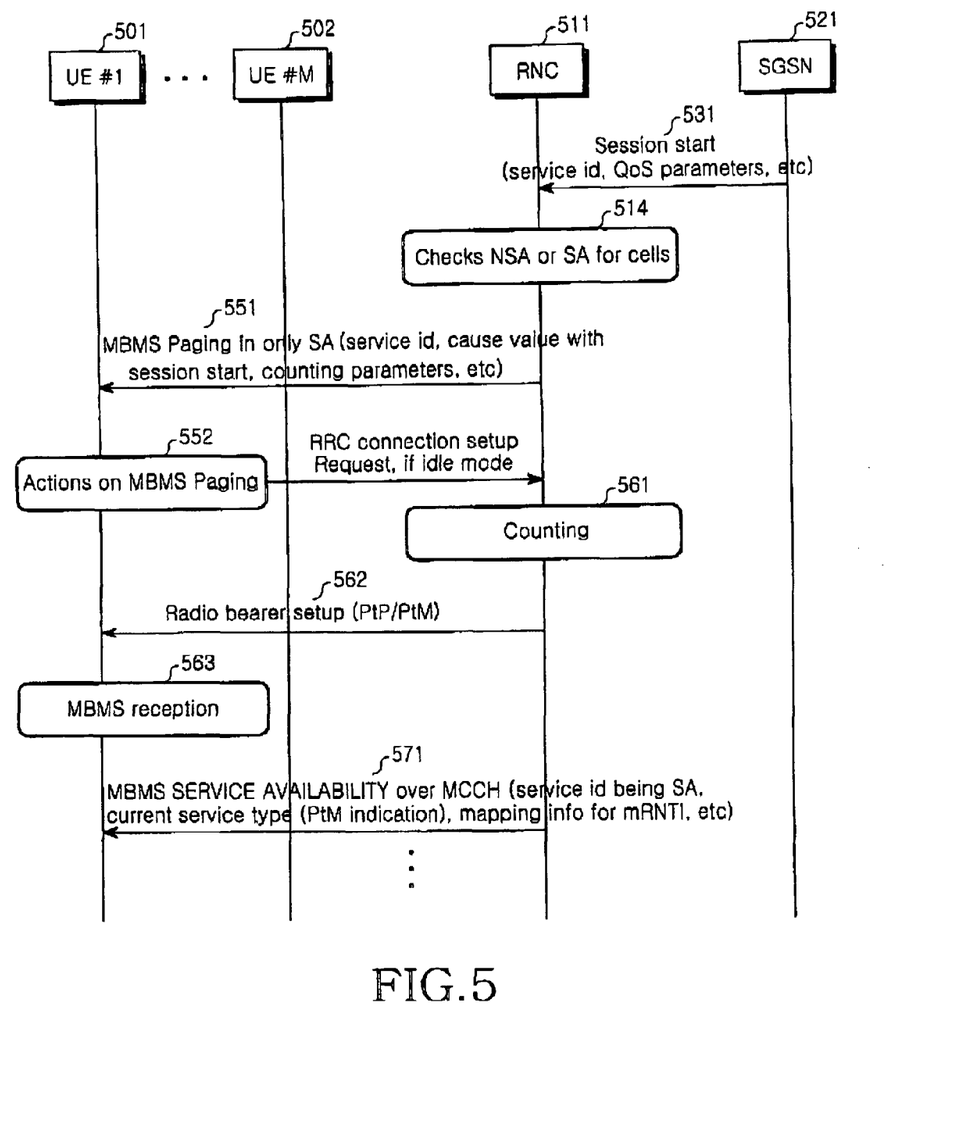
FIG. 5 is a flowchart showing transmission of control information on a MBMS according to a preferred embodiment of the present invention.

FIG. 5 is a flowchart showing transmission of control information on a MBMS according to a preferred embodiment of the present invention. The message flowchart shows an operation for informing a UE of information on the availability of an MBMS via an MCCH according to a preferred embodiment of the present invention. In FIG. 5, reference numerals 501 and 502 refer to UEs which are receiving MBMS, numeral 511 refers to an RNC which controls the radio connection of the UEs 501 and 502 for the MBMS, and numeral 521 refers to an SGSN which controls the RNC 511. Although the UEs 501 and 502 want to receive a single identical MBMS, the UE (#1) 501 is positioned in a cell having SA and the UEs (#M) 502 are positioned in a cell having NSA.

Referring to FIG. 5, the RNC 511 receives a session start message regarding a specific MBMS from the SGSN 521 in step 531. The session start message includes parameters, such as an MBMS identifier and Quality of Service (QoS). The RNC 511 refers to the parameters in step 514 and checks the availability of the MBMS (i.e. whether it has SA or NSA) for each cell managed by the RNC 511. The availability check must be performed considering not only the local limitation of the service but also the resource limitation within other cells. As such, the MBMS may have NSA in a specific cell due to the reason that it is a local service or that radio resources within the cell are lacking.

The RNC 511 transmits an MBMS paging message, in relation to the MBMS, to the UE 501 via an MBMS paging channel in step 551. The MBMS paging message is transmitted only to cells having SA, i.e. cells in which MBMS is available, in order to announce that an event, such as the session start for the MBMS, has occurred. The MBMS paging message includes an MBMS identifier, a cause value set up as session start indication, and the like. Parameters necessary for UE counting may be additionally included as Optional Values (hereinafter referred to as OVs) or as Conditional Values (hereinafter referred to as CVs). The parameters are used for RRC connection setup procedure by UEs in an idle mode. The MBMS paging message can be transmitted even when MBMS is being provided and has parameters corresponding to the kind of service events and MBMS control messages which must be received.

When the UEs are positioned in cells wherein the MBMS has SA, they perform operations according to the MBMS identifier and the cause value, which are included in the MBMS paging message, as well as their connection state. For example, if UE #1 501 is in an idle mode and responds to the MBMS paging message in step 552 and transmits an RRC connection setup request message for receiving the MBMS to the RNC 511 via an up-link.

The RNC 511 counts the UEs which want to receive MBMS in step 561. Specifically, the RNC counts the number of UE which have set RRC connection in response to the MBMS paging message. The RNC 511 transmits an RB setup message, which includes configuration information of an RB for MBMS, to the UE #1 501 in step 562. The RB configuration information is related to an RB of PtP or PtM type according to the counting result in step 561. The UE #1 501 receives data of the MBMS via an RB which has been set up according to the RB configuration information in step 563.

The RNC 511 transmits an MBMS service availability message to each cell under management via an MCCH according to a schedule in step 571, for the sake of UEs which are moving between cells while receiving MBMS. The MBMS service availability message transmitted to each cell includes the identifiers of MBMSs which correspond to SA in the corresponding cells, but not those of MBMSs which correspond to NSA. When a specific service identifier is included in the MBMS service availability message, the corresponding MBMS is available. The MBMS service availability message is transmitted periodically or when a service event has occurred, according to the schedule of the RNC.

When a UE wants to receive MBMS in a cell having NSA, the UE does not need to perform an operation, such as RRC connection setup, for receiving the MBMS. In contrast, when a UE wants to receive MBMS in a cell having SA, the UE checks the service type of the MBMS. When the MBMS is PtM, the UE sets up a PtM RB using PtM RB information obtained through an MBMS RB information message and receives data of the MBMS. When the MBMS is not PtM, the UE performs RRC connection setup, if necessary, and requests the MBMS.

Figure 6:
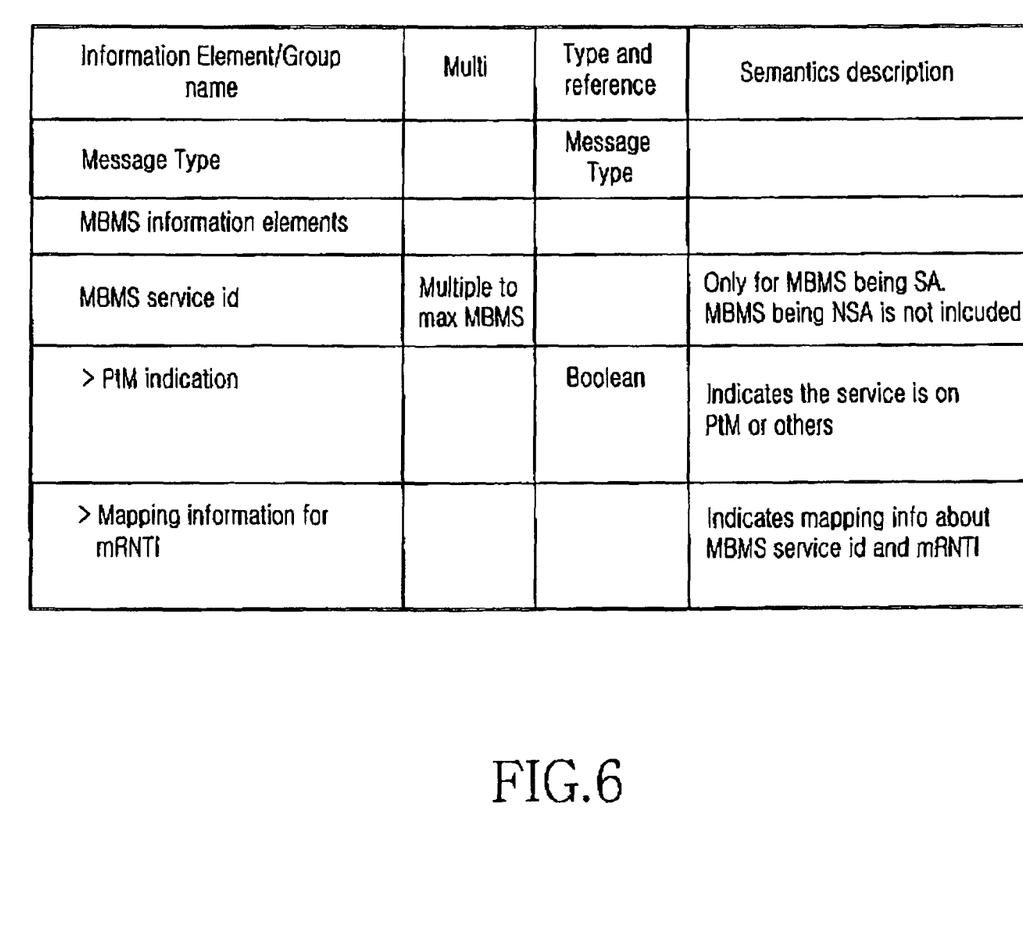
FIG. 6 shows a format of service availability messages which are transmitted according to a preferred embodiment of the present invention.

FIG. 6 shows a format of service availability messages which are transmitted via MCCHs according to a preferred embodiment of the present invention. As shown in FIG. 6, the service availability information includes a message type and at least one message information element corresponding to an MBMS which has SA.

Referring to FIG. 6, the message information element includes an MBMS identifier, a service type, and mapping information of a Radio Network Temporary Identifier for MBMS (mRNTI) for the MBMS identifier. The service type may indicate either no UE, a PtP, or a PtM indication. As used herein, "no UE" means that a specific cell does not have a UE which receives a specific MBMS. The mapping information is either an OV or a CV which is included only when the service type is PtP or PtM.

If the method described above in regard to FIG. 5 is used, it is possible to reduce the overhead caused by unnecessary RRC connection setup for a UE which is in an idle mode. However, even when a MBMS is currently unavailable in a specific cell, it may become available later. Therefore, a UE performs an operation to receive an MBMS paging message even in a cell having NSA. Suppose that, although a cell can locally provide MBMS, the cell is may temporarily not be providing MBMS for lack of radio resources. The cell can later provide MBMS when the radio resources are available. When a UE in an idle mode confirms that an MBMS, which it wants to receive, has NSA in the current cell via an MBMS service availability message, it continuously performs the operation of checking whether there is MBMS paging, although it does not need to perform RRC connection setup procedure.

Figure 7:
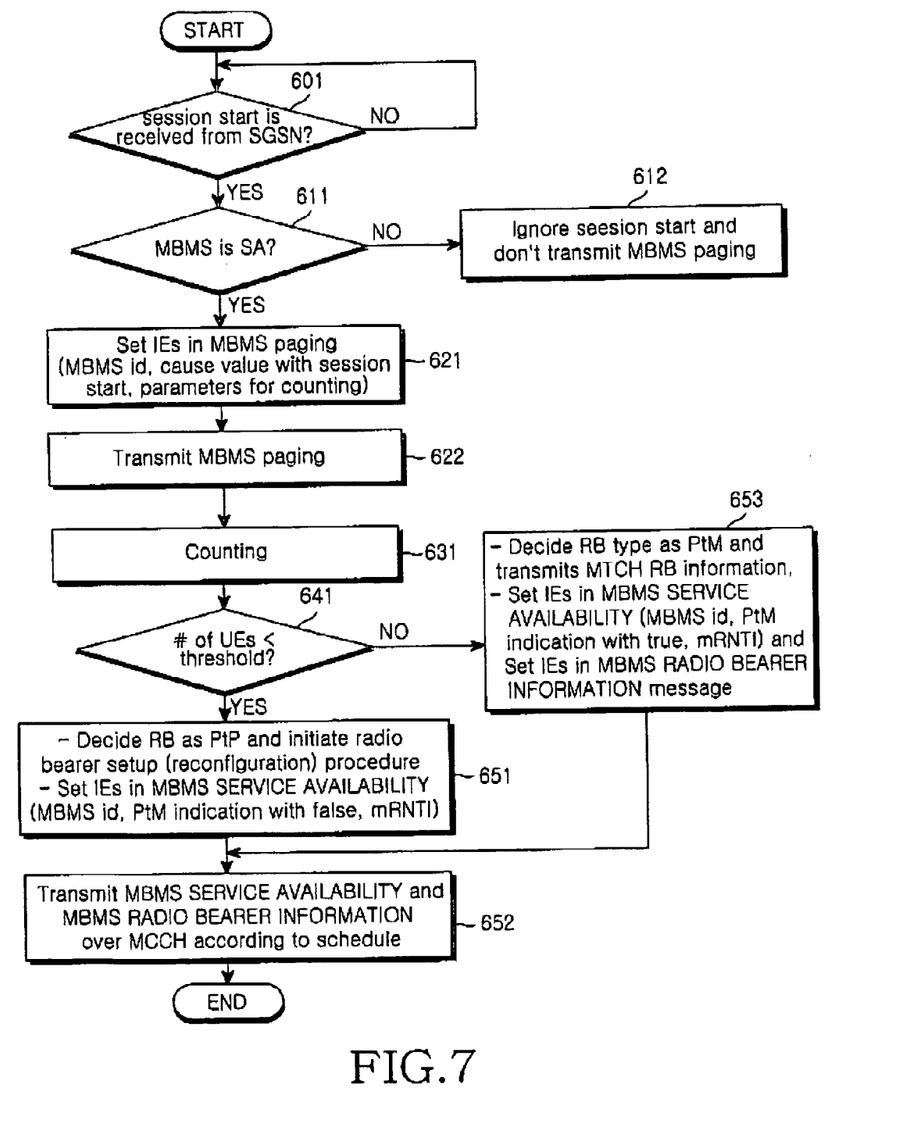
FIG. 7 is a flowchart showing the operation of an RNC according to a preferred embodiment of the present invention.

FIG. 7 is a flowchart showing the operation of an RNC according to a preferred embodiment of the present invention. Referring to FIG. 7, the RNC checks whether a session start message is received from an SGSN in step 601. If a session start message of an MBMS is received, the RNC decides whether the MBMS has SA in a cell under management in step 611. If the MBMS has NSA (i.e. does not have SA) in step 611, the RNC ignores any service event caused by the reception of the session start message in step 612 and does not transmit any MBMS paging message in the cell.

In contrast, if the MBMS has SA, the RNC sets up information for MBMS paging in step 621 and loads the setup information into an MBMS paging message for transmission in step 622. The setup information includes an MBMS identifier, a cause value indicating session start, or parameters necessary for RRC connection setup (when RRC connection of UEs in an idle mode is necessary). In order to decide the service type of an MBMS RB for the MBMS, the RNC sets up the parameters for RRC connection setup in the MBMS paging message in step 621 and transmits the MBMS paging message in step 622. UEs in an idle mode then perform RRC connection setup procedure according to the parameters and enters into a connection mode.

The RNC counts the number of UEs which are in the connection mode for the MBMS in step 631. This is, for example, for the purpose of considering UEs which have newly entered into the connection mode in response to the paging message in step 622. The count value is compared with a predetermined threshold value for deciding a PtM-type service in step 641. The RNC proceeds to step 653 if the count value is equal to or larger than the threshold value. The RNC proceeds to step 651 if the count value is less than the threshold value.

In step 651 it is decided whether the MBMS is of a PtP type and a procedure for PtP RB setup or RB reconfiguration is performed. The RNC sets up a service identifier, sets a PtM indication as false, and sets mRNTI mapping information in an MBMS service availability message. The MBMS service availability message includes information on PtP-type services and information about MBMSs which are not currently provided due to the absence of UEs requiring them, though corresponding service sessions have already started.

In step 653 the RNC decides whether the MBMS is of PtM type and transmits RB information of an MTCH, which is a common channel, to UEs. The RNC also sets up information elements, in step 653, for an MBMS availability message and an MBMS RB information message for transmitting during the MBMS. A service identifier, a PtM indication, and mRNTI mapping information are set up for the MBMS service availability message and information of logical channel/transmission channel/physical channel is set up for the MBMS RB information message. Then, the PtM indication is set as true.

The MBMS service availability message and the MBMS RB information message, which have been set up in step 652 or 653, are transmitted via an MCCH according to a schedule of the RNC in step 652. For example, the messages are periodically transmitted according to a predetermined period.

Figure 8:
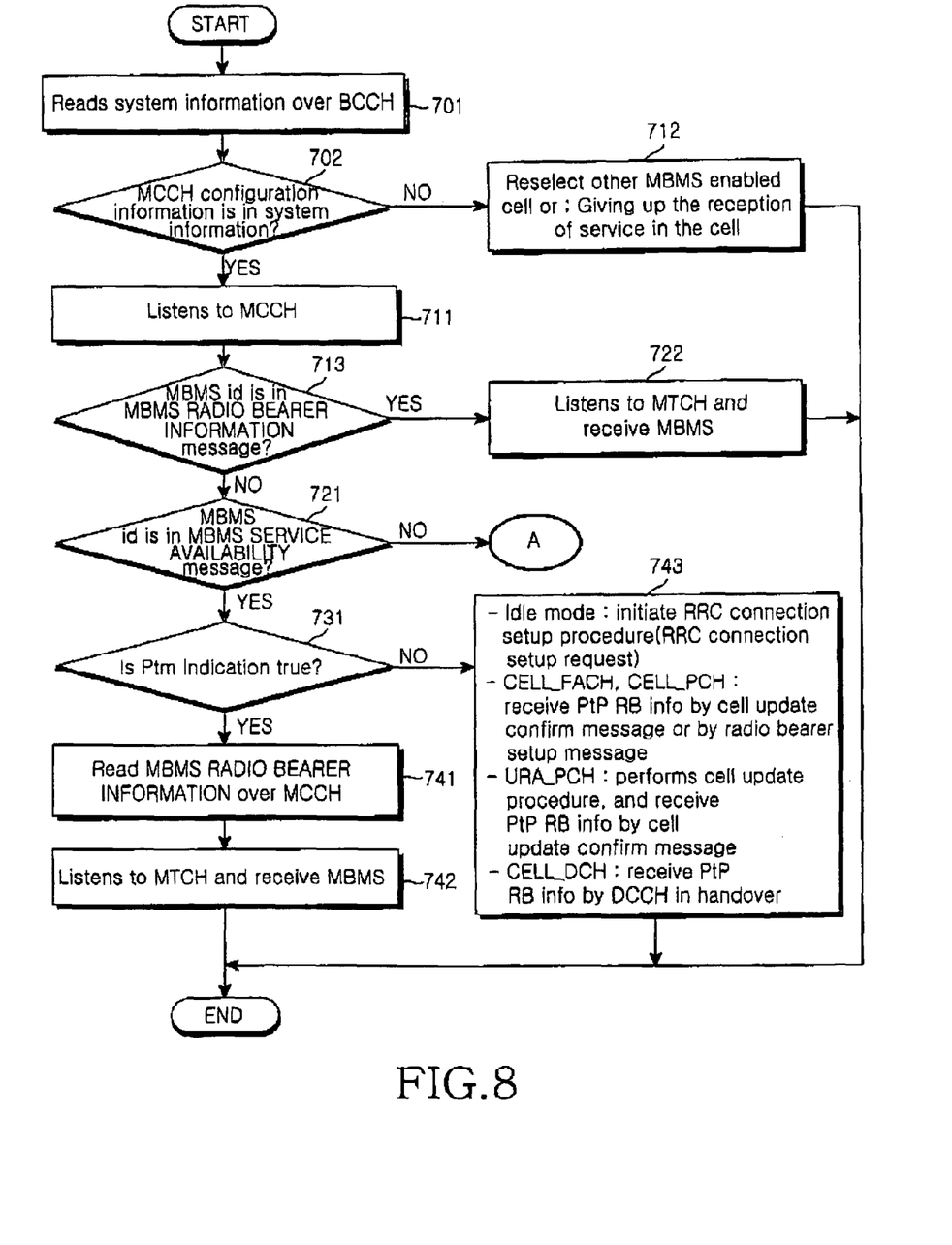
FIG. 8 is a flowchart showing the operation of a UE according to a preferred embodiment of the present invention.

FIG. 8 is a flowchart showing the operation of a UE according to a preferred embodiment of the present invention. Referring to FIG. 8, a UE reads system information transmitted via a BCCH in step 701 when power is initially turned on or when the UE enters into a new cell. The UE decides whether the system information includes information on MCCH configuration in step 702. If the system information does not include information on MCCH configuration, the UE concludes in step 712 that a desired MBMS is not available (i.e. has NSA) in the current cell. The UE then searches and reselects another cell which supports the MBMS or gives up receiving the MBMS. The UE neither sets up RRC connection to request a desired MBMS nor monitors a paging channel related to MBMSs, in order to avoid any unnecessary power consumption.

If the MCCH configuration information is known via the system information, the UE receives an MCCH using the MCCH configuration information in step 711. The UE receives an MBMS RB information message and/or an MBMS service availability message via the MCCH. The UE confirms in step 713 whether the MBMS RB information message received via the MCCH includes the identifier of an MBMS which it wants to receive. If the identifier of the MBMS is included, the UE proceeds to step 722 and receives data of the MBMS via an MTCH.

Figure 9:
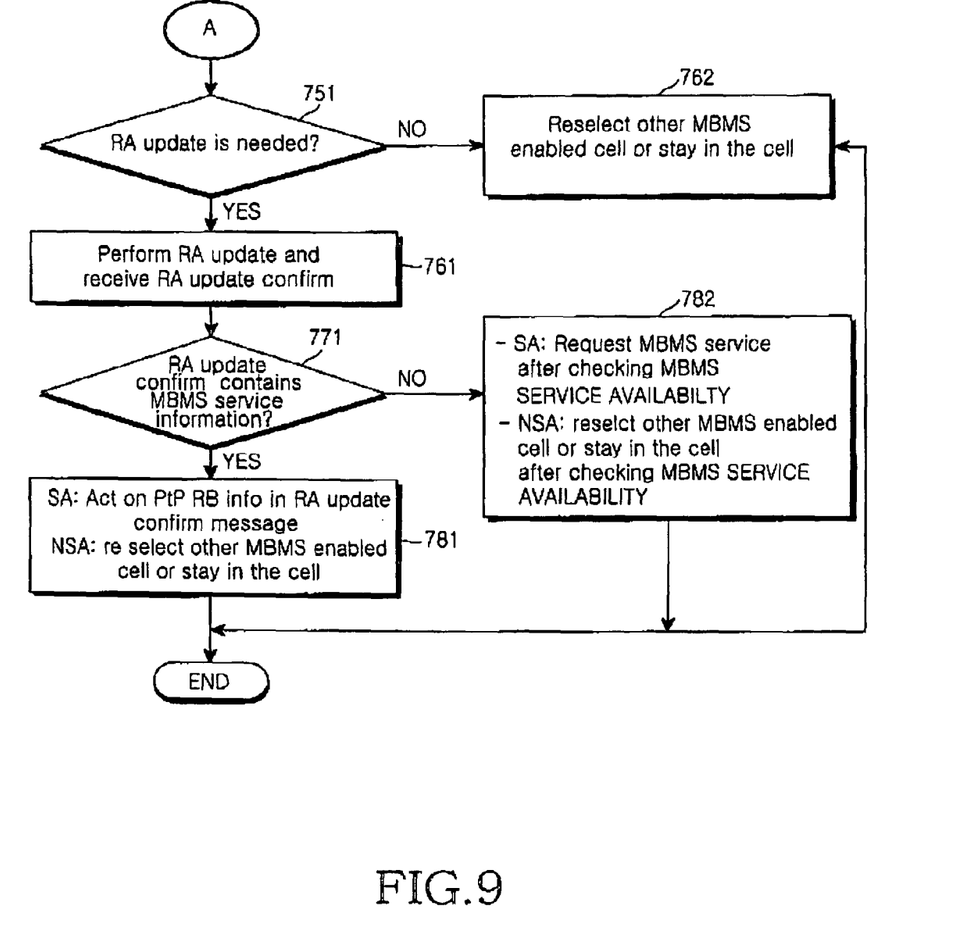
FIG. 9 is a flowchart wherein a UE performs Routing Area (RA) update after receiving a service availability message of MBMS according to a preferred embodiment of the present invention.

If the MBMS RB information message does not include the MBMS identifier, the UE checks in step 721 whether the MBMS service availability message received via the MCCH includes the MBMS identifier which the UE wants to receive. If the MBMS identifier is not included, the UE proceeds to step 751 of FIG. 9 and performs a Routing Area (RA) update if necessary. FIG. 9 will be described below in detail.

If the MBMS service availability message includes the identifier of the MBMS, the UE checks in step 731 whether the PtM indication included in the MBMS service availability message is true or false. If the PtM indication is false, the UE proceeds to step 743.

In step 743, the UE performs an operation based on its current state. If in an idle mode, the UE transmits RRC connection setup request, initializes RRC connection setup, and enters into a connection mode. If in a connection mode, the UE operates as follows. In a CELL_FACH or CELL_PCH state, wherein a FACH (Forward Access CHannel) or a PCH (Paging CHannel) is monitored, the UE waits for a cell update check message or an RB setup message from the RNC and receives PtP RB information from the cell update check message or the RB setup message. In a URA_PCH (UTRAN Registration AreaPaging Channel) state, wherein cell update is performed less frequently than in the CELL_PCH state, the UE performs an update procedure and obtains PtP RB information by means of a cell update check message, which is received from the RNC during the cell update procedure. In a CELL_DCH state, wherein a DCH (Dedicated CHannel) is monitored, the UE performs a handover procedure and receives PtP RB information via a dedicated control channel during the handover procedure. The TU then sets up an RB using the PtP RB information and receives the MBMS via the DCH.

If the PtM indication proves to be true in step 731, the UE proceeds to step 741 and receives MBMS RB information via the MCCH. The UE sets up an RB of a PtM mode according to the MBMS RB information and receives data of the MBMS via an MTCH in step 742. After beginning to receive data of the MBMS, the UE receives an MBMS RB information message and an MBMS availability message, which are periodically transmitted in a predetermined time interval according to a schedule instructed by the RNC. The messages enable the UE to continuously receive the MBMS while moving between cells.

FIG. 9 is a flowchart wherein an UE performs RA update after receiving a service availability message of an MBMS according to a preferred embodiment of the present invention. An update is performed in a cell wherein an MBMS, which the UE wants to receive, has NSA. The steps of FIG. 9 continues from "No" of step 721, as described above in regard to FIG. 8.

Referring to FIG. 9, if an MBMS which the UE wants to receive has NSA in the current cell, the UE decides in step 751 whether RA update is necessary in the current cell. The decision depends on whether the RA to which the current cell belongs is different from that to which the previous cell belongs. If RA update is unnecessary, the UE searches and reselects another cell which supports the MBMS or stays in the current cell in step 762. In the latter case, the UE periodically monitors paging channels which are related to MBMSs in order to checking that the MBMS starts in the current cell.

If the RA update is necessary, in contrast, the UE transmits an RA update request message to the RNC in step 761 and waits the arrival of an RA update check message from the RNC. The UE checks in step 771 whether the RA update check message, which has arrived from the RNC, includes MBMS information. As used herein, the MBMS information includes all kinds of information included in the MBMS availability message and the MBMS RB information message, in particular, the service identifiers of MBMSs having SA, service type, and PtP RB information.

If the RA update check message includes the MBMS information, the UE decides in step 781 whether the MBMS it wants to receive has SA or NSA, based on the MBMS information read from the RA update check message. If the MBMS it wants to receive has NSA, the UE searches and reselects another cell which supports the MBMS or stays in the current cell. In the latter case, the UE periodically monitors the paging channel which are related to MBMSs. If the MBMS has SA, in contrast, the UE sets up an RA based on the PtP RB information included in the RA update check message and receives data of the MBMS via a DCH.

If the RA update check message does not include the MBMS information, the UE decides in step 782 whether the MBMS wants to receive has SA or NSA based on the MBMS availability message which has been received after the RA update check message. If the MBMS has NSA, the UE searches and reselects another cell which supports the MBMS or stays in the current cell. In the latter case, the UE periodically monitors the paging channel which are related to MBMSs. If the MBMS has SA, in contrast, the UE requests the MBMS. If an RB setup message having PtP RB information is received prior to step 782, the UE receives the MBMS according to the PtP RB information. If the MBMS availability message which has been received after the RA update check message does not include a service identifier of the MBMS it wants to receive, the UE determines that the RA update is not needed. This is for the purpose of preventing the RA update which have repeated unnecessarily.

As mentioned above, the advantages of the present include in a mobile communication system which provides MBMS, allowing a UE to be aware of whether a desired MBMS is available in the current cell using control messages received via an MCCH. It is possible to improve the continuity of MBMS reception when UEs using MBMS are moving. UEs can selectively perform RRC setup only when a desired MBMS is available in the current cell. This decreases the overhead caused by unnecessary RRC connection setup.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting service availability information in a mobile communication system, the method comprising:
   determining a plurality of cells capable of serving a particular MBMS (Multimedia Broadcast/Multicast Service);
   selectively transmitting a paging message to all UEs (User Equipments) in the plurality of cells capable of serving the particular MBMS;
   receiving an RRC (Radio Resource Control) connection setup request from at least one of the UEs in an idle mode requesting to receive the particular MBMS;
   counting a number of the at least one of the UEs;
   setting a service identifier indicating the particular MBMS which is being served or can be served in each cell when the at least one of the UEs requests the particular MBMS;
   setting information related to PtM (Point-to-Multipoint) or PtP (Point-to-Point) to the UEs positioned in the plurality of cells to which the particular MBMS is available, based on the counted number of the at least one of the UEs;
   setting MBMS RB (Radio Bearer) information including a logical channel, a transport channel, and a physical channel for the particular MBMS according the information related to the PtM or the PtP to the UEs positioned in the plurality of cells to which the particular MBMS is available;
   setting information regarding a session start for the particular MBMS;
   generating a service availability message including the service identifier, the information related to the PtM or the PtP, the MBMS RB information, and the information regarding the session start for the particular MBMS;
periodically transmitting, on an MCCH (MBMS control channel), the service availability message regarding at least the particular MBMS, which is available in the plurality of cells, to the at least one of the UEs in the plurality of cells capable of serving the particular MBMS; and
transmitting the particular MBMS based on the MCCH.

2. A method for receiving service availability information in a mobile communication system, the method comprising:
receiving, by a UE (User Equipment), a paging message from at least one cell among the plurality of cells capable of serving a particular MBMS (Multimedia Broadcast/Multicast Service);
transmitting an RRC (Radio Resource Control) connection setup request to the at least one cell, if the UE is in an idle mode;
periodically receiving, on an MCCH (MBMS control channel), a service availability message on at least one MBMS, which is available to the at least one cell in which the UE is currently positioned;
acquiring a service identifier indicating the particular MBMS which is being served or can be served in the at least one cell, when the UE requests the particular MBMS;
acquiring information related to PtM (Point-to-Multipoint) or PtP (Point-to-Point) to the UEs positioned in the plurality of cells to which the particular MBMS is available, which is set based on a counted number of UEs in idle mode requesting to receive the particular MBMS;
acquiring MBMS RB (Radio Bearer) information including a logical channel, a transport channel, and a physical channel for the particular MBMS defined according the information related to the PtM or the PtP;
acquiring information regarding a session start for the particular MBMS in the at least one cell in which the UE is currently positioned; and
receiving the particular MBMS at the at least one cell, in which the UE is currently positioned, when the particular MBMS is available, based on the acquired service identifier, the information related to the PtM or the PtP, the MBMS RB information, and the information regarding the session start.

3. The method as claimed in claim 2, wherein receiving the particular MBMS further comprises:
obtaining the MBMS RB information via a cell update check message or an RB setup message received from an RNC (Radio Network Controller), when the UE is in a CELL_FACH or CELL_PCH state;
performing a cell update procedure with the RNC when the UE is in a URA_PCH state, and obtaining the MBMS RB information via the cell update check message received from the RNC; and
performing a handover procedure with the RNC when the UE is in a CELL_DCH state, and receiving the MBMS RB information from the RNC via the dedicated channel.

4. The method as claimed in claim 2, wherein receiving the service availability message further comprises:
receiving system information via a broadcast channel and determining whether the system information includes configuration information of an MBMS control channel;
receiving an RB information message via the MBMS control channel using the configuration information of the MBMS control channel when the configuration information of the MBMS control channel is included, and determining when the RB information message includes the service identifier of the particular MBMS;
receiving the particular MBMS using the RB information of the particular MBMS included in the RB information message when the RB information message includes the service identifier of the particular MBMS; and
receiving the service availability message via the MBMS control channel when the RB information message does not include the service identifier of the particular MBMS.

5. The method as claimed in claim 2, further comprising performing a routing area update when the service availability message does not include the service identifier of the particular MBMS.

6. The method as claimed in claim 5, wherein the step of performing the routing area update further comprises:
determining whether the routing update is necessary;
reselecting another cell capable of providing the particular MBMS or staying in a current cell when the routing area update is unnecessary;
requesting routing area update to an RNC (Radio Network Controller) and receiving a routing area update check message when the rouging area update is necessary;
determining whether the routing area update check message includes service information on at least one MBMS which is available to the cell in which the UE is currently positioned;
determining whether the particular MBMS is available according to the service information when the routing area update check message includes the service information; and
determining whether the particular MBMS is available according to the service availability message received after performing the rouging area update, when the routing area update check message does not include the service information.

7. The method as claimed in claim 6, wherein the step of performing the routing area update further comprises:
receiving the particular MBMS according to the PtP RB information on the particular MBMS included in the service information when the wanted MBMS is available according to the service information included in the routing area update check message; and
reselecting another cell capable of providing the particular MBMS or staying in the current cell when the particular MBMS is unavailable according to the service information.

8. The method as claimed in claim 6, wherein the step of performing the routing area update further comprises:
requesting the particular MBMS to the RNC when the particular MBMS is available according to the service availability message received after performing the routing area update check message;
reselecting another cell capable of providing the particular MBMS or staying in the current cell when the particular MBMS is unavailable according to the service availability message received after performing the routing area update check message; and
receiving the particular MBMS according to the PtP RB information when an RB setup message including the PtP RB information of the particular MBMS is received after performing the routing area update check message.

9. The method as claimed in claim 6, wherein the step of staying in the current cell includes periodically monitoring paging channels related to MBMSs in the current cell.

10. An apparatus of a Node B for transmitting service availability information in a mobile communication system, the apparatus comprising:

- a receiver being adapted for receiving an RRC (Radio Resource Control) connection setup request from at least one of UEs (User Equipments) in an idle mode requesting to receive a particular MBMS (Multimedia Broadcast/Multicast Service);
- a processor being adapted for
    - determining a plurality of cells capable of serving the particular MBMS, and counting a number of the at least one of the UEs,
    - setting a service identifier indicating the particular MBMS which is being served or can be served in each cell when the at least one of the UEs requests the particular MBMS,
    - setting information related to PtM (Point-to-Multipoint) or PtP (Point-to-Point) to the UEs positioned in the plurality of cells to which the particular MBMS is available, based on the counted number of the at least one of the UEs,
    - setting MBMS RB (Radio Bearer) information including a logical channel, a transport channel, and a physical channel for the particular MBMS according the information related to the PtM or the PtP to the UEs positioned in the plurality of cells to which the particular MBMS is available,
    - setting information regarding a session start for the particular MBMS, and
    - generating a service availability message including the service identifier, the information related to the PtM or the PtP, the MBMS RB information, and information regarding the session start for the particular MBMS; and
- a transmitter being adapted for
    - selectively transmitting a paging message to all the UEs in the plurality of cells capable of serving the particular MBMS,
    - periodically transmitting, on an MCCH (MBMS control channel), the service availability message regarding at least the particular MBMS, which is available in the plurality of cells, to the at least one of the UEs in the plurality of cells capable of serving the particular MBMS, and
    - transmitting the particular MBMS based on the MCCH.

11. An apparatus of a UE (User Equipment) for receiving service availability information in a mobile communication system, the apparatus comprising:

- a transmitter being adapted for transmitting an RRC (Radio Resource Control) connection setup request to at least one cell among the plurality of cells capable of serving a particular Multimedia Broadcast/Multicast Service (MBMS), if the UE is in idle mode;
- a receiver being adapted for periodically receiving a paging message from the at least one cell, on an MCCH (MBMS control channel), a service availability message on at least one MBMS, which is available to the at least one cell in which the UE is currently positioned, and the particular MBMS; and
- a processor being adapted for acquiring, on the MCCH,
    - a service identifier indicating the particular MBMS which is being served or can be served in the at least one cell when the UE requests the particular MBMS,
    - information related to PtM (Point-to-Multipoint) or PtP (Point-to-Point) to the UEs positioned in the plurality of cells to which the particular MBMS is available, based on a counted number of UEs in an idle mode requesting to receive the particular MBMS,
    - MBMS RB (Radio Bearer) information including a logical channel, a transport channel, and a physical channel for the particular MBMS defined according the information related to the PtM or the PtP, and
    - information regarding a session start for the particular MBMS in the cell in which the UE is currently positioned,
- wherein the particular MBMS is received at the at least one cell, in which the UE is currently positioned, when the particular MBMS is available, based on the acquired service identifier, the information related to the PtM or the PtP, the MBMS RB information, and the information regarding the session start.

* * * * *